J. H. BULLEN.
PUMP VALVE.
APPLICATION FILED AUG. 19, 1920.

1,382,408.

Patented June 21, 1921.

Inventor
John H. Bullen

UNITED STATES PATENT OFFICE.

JOHN H. BULLEN, OF LAKEWOOD, OHIO.

PUMP-VALVE.

1,382,408.  Specification of Letters Patent.  Patented June 21, 1921.

Application filed August 19, 1920. Serial No. 404,548.

*To all whom it may concern:*

Be it known that I, JOHN H. BULLEN, a citizen of the United States, residing at Lakewood, in the county of Cuyahoga and State of Ohio, have invented a certain new and useful Improvement in Pump-Valves, of which the following is a full, clear, and exact description, reference being had to the accompanying drawings.

This invention relates to valves and more particularly to pump valves such as are used in connection with steam pumps and similar machines wherein the valve is subjected to hot and cold water and other liquids.

Heretofore structures of this character have had the valve made from cork, wood, lignum-vitæ or similar material of a more or less rigid nature which is objectionable for many reasons, among the most important of which, is that valves of this nature retain foreign substances such as sand with which the water is often contaminated and such foreign substances become embedded in the valve with the resultant shortening of its life and imperfect seating. I have found that a valve made from leather (because of its peculiar nature and properties) overcomes these objections and offers a clean surface at all times and hence permits perfect seating and longer life.

The main object of my invention is to provide a valve case which shall employ novel means for holding the valve which is of a semi-rigid and resilient nature, and hence requires holding means peculiar to its physical properties.

Another object is to provide a valve which is simple in construction, inexpensive to manufacture and easily renewed when necessary, while further objects and advantages will appear as the description proceeds.

Figure 1:
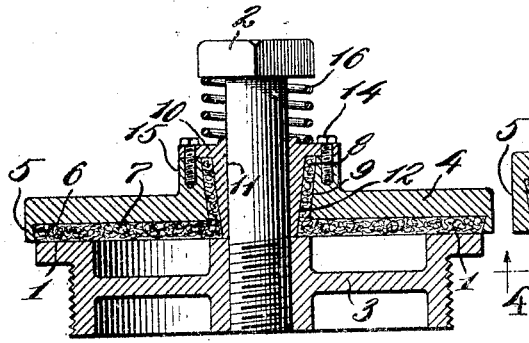
Figure 3:
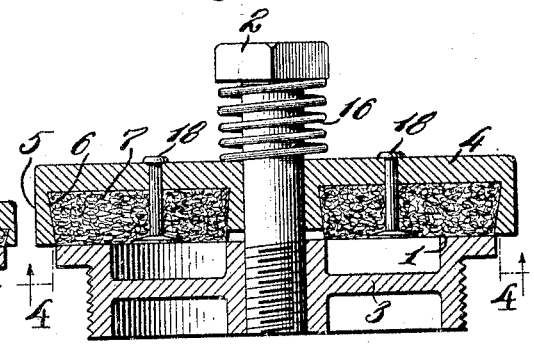
Figure 2:
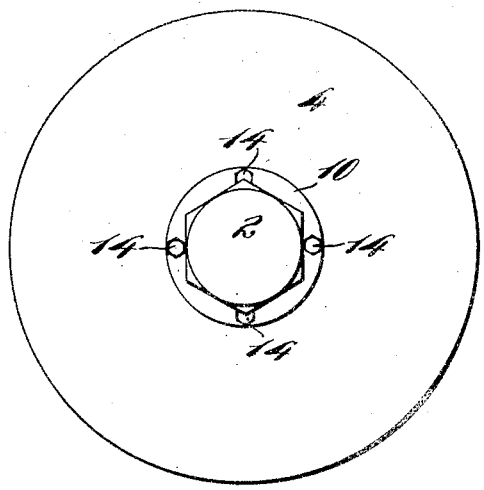

In the accompanying drawing wherein I have shown certain illustrative embodiments of my invention but without intent to limit myself thereto, Figure 1 is a vertical sectional view of one form of my valve; Fig. 2 is a top plan view thereof; Fig. 3 is a vertical sectional view of a modification and Fig. 4 is a horizontal sectional view taken on the line 4—4 of Fig. 3.

Describing by reference characters the various parts illustrated, 1 indicates the valve seat which is of the usual construction in valves of this type. A bolt 2 is threaded into the hub portion of the spider 3 and forms a guide for the valve casing 4 which is provided at the circumferential edge thereof with a flanged portion 5 under-cut on the inner surface as indicated at 6. The valve 7 is made from leather specially tanned to resist heat and water and is formed with an upstanding collar 8 which fits within a tapered bore 9 of the case 4. A bushing 10 having a bore 11 and a tapered outer surface 12 is forced into engagement with the leather collar 8 to secure said valve at the central point. The bushing may be retained in tight relationship by any suitable fastening means as the machine screws 14 which are threaded into a boss 15 formed integral with the casing 4. In practice the leather valve is cut to a diameter slightly larger than the inner diameter of the flange 5 so that when the valve is placed in the casing the leather will be forced into the under-cut portion of the flange and thus secure the circumferential edge of the valve. A spring 16 interposed between the head of the guide bolt 2 and the bushing 10 serves to hold the valve seated normally.

Figure 4:
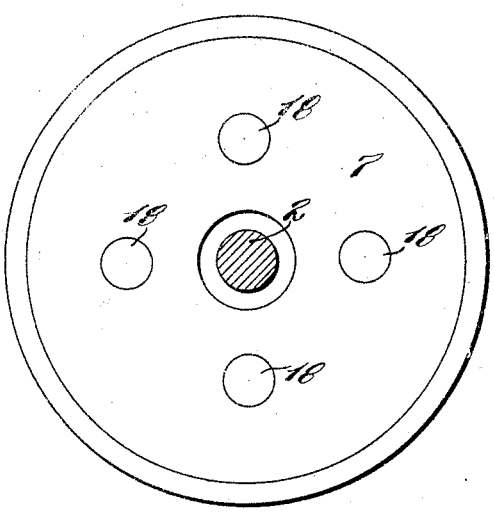

In Figs. 3 and 4 I have shown a modification of the central fastening means for the valve. In this form, the valve is held at its periphery in a manner similar to that previously described but intermediate the periphery and the center of the valve, a plurality of rivets 18 are inserted with the head portion abutting the leather valve and the body portion riveted over on the outer surface of the casing 4.

Having thus described my invention, what I claim is:—

1. In a pump valve, the combination with a valve seat, of a valve casing movable toward and from said seat, said casing being provided with a peripheral flanged portion, a valve positioned in said casing and having its periphery abutting said flanged portion, a collar projecting from said valve, and means for securing said collar to said casing.

2. In a pump valve, the combination with a valve seat, of a valve casing movable toward and from said seat, a leather valve carried by said casing and having an upstanding collar formed integral therewith, and means carried by said casing for securing said collar to said casing.

3. In a pump valve, the combination with a valve seat, of a valve casing movable toward and from said seat, said casing being provided with a peripheral flanged portion, a leather valve positioned in said casing and having its periphery abutting said flanged portion, a boss on said casing having a bore therein, a collar formed integral with said valve, and fitted within said bore and means for securing said collar within said bore.

4. In a pump valve, the combination with a valve seat, of a valve casing movable toward and from said seat, and provided at the central portion thereof with a tapered bore, a leather valve carried by said casing having an upstanding collar and fitted within said tapered bore, a tapered bushing fitted within said collar and secured to said casing for clamping said valve to said casing.

In testimony whereof, I hereunto affix my signature.

JOHN H. BULLEN.